Oct. 23, 1956 L. F. LYONS 2,768,357
TUNING LINE
Filed Feb. 4, 1954 2 Sheets-Sheet 1

INVENTOR.
Lambert F. Lyons
BY [signature]
ATTORNEY

Oct. 23, 1956

L. F. LYONS 2,768,357

TUNING LINE

Filed Feb. 4, 1954

2 Sheets-Sheet 2

INVENTOR.
Lambert F. Lyons

BY [signature]

ATTORNEY 2,768,357

TUNING LINE

Lambert Frank Lyons, San Fernando, Calif., assignor to Bendix Aviation Corporation, North Hollywood, Calif., a corporation of Delaware Application February 4, 1954, Serial No. 408,137

2 Claims. (Cl. 333—82)

This invention relates to transmission lines for use in high frequency circuits for tuning and filtering purposes and the like.

It is known that transmission lines often have advantages over conventional networks of lumped inductance and capacity where the frequency is high enough to reduce to practical size the physical dimensions of a line of the required wave length.

The primary function of an ordinary transmission line is to effect electrical connection between two spaced points, and its physical length is determined by the spacing. However, a line used primarily as a circuit or tuning element need only have a certain electrical length (in terms of wave length), and it is usually desirable to keep its physical dimensions as small as possible. As used herein, the expression "tuning line" distinguishes a transmission line used primarily for tuning or analogous purposes from a transmission line the primary function of which is to complete an electrical circuit between two spaced points.

An object of the invention is to provide a tuning line having low losses and uniform distributed constants that is exceptionally compact physically relative to its electrical length.

Other more specific objects and features of the invention will appear from the description to follow.

Briefly, the invention in its preferred form comprises an electrical conductor wound in a spiral having closely spaced turns and sandwiched between, but electrically insulated from, two parallel ground members. I have found that, for practical purposes, such a structure is the electrical equivalent of a straight conductor of the same length parallel to a ground conductor, but obviously is much more compact. The line characteristics, such as surge impedance and electrical length, are determined by the geometry of the conductor, its physical length, the distance between the conductor and the ground members, and the dielectric constant of the insulating material.

It is recognized that it is old to use a length of coaxial cable as a tuning line and to fold or wind the coaxial cable upon itself for compactness. Because of the fact that the inner conductor of coaxial cable is substantially completely shielded by the outer conductor, changing the configuration of a length of coaxial cable does not change its distributed inductance and capacity.

A tuning line in accordance with the present invention has the advantage of being much more compact than a line formed of coaxial cable, even if the latter is wound in a tight spiral. The reason for this is that the entire length of the spiral conductor utilizes the same ground and dielectric members to achieve the required distributed capacity. The distributed inductance along the length of the conductor is not altered by the spiral configuration since mutual inductance between turns of the spiral is exactly compensated by mutual capacity between turns. The physical length of the conductor is thereby the same as if the conductor were a straight line between the ground planes. The turns of the spiral can be spaced more closely to each other than the inner conductor of a coaxial cable since the spacing between successive turns is limited only by short circuiting between turns.

A full understanding of the invention may be had from the following detailed description with reference to the drawing, in which.

Figure 1:
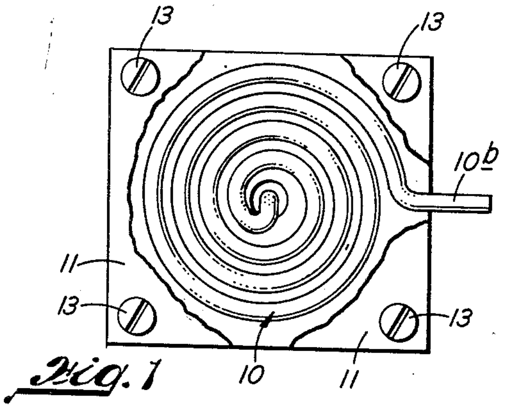
Fig. 1 is a plan view, with portions broken away, of a simple tuning line in accordance with the invention.
Figure 2:
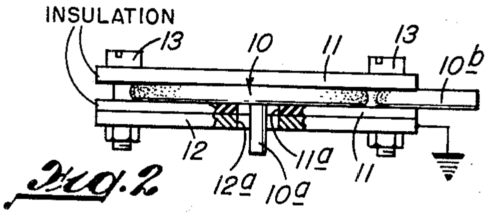
Fig. 2 is a front elevational view of the device shown in Fig. 1, portions being broken away.

Referring first to Figs. 1 and 2, the tuning line therein disclosed comprises a conductive winding in the form of a spiral 10 sandwiched between two dielectric walls 11, 11, one of which lies against a ground member consisting of a plate 12 of conductive material, preferably, a relatively heavy metal sheet, to provide mechanical rigidity. The assembly may be secured together by four bolts 13 positioned at the corners of the dielectric walls 11 and ground plate 12 which, as shown, are of rectangular shape. To provide electrical terminals for the spiral 10, the inner end 10*a* of the conductor is extended at right angles beyond the inner end of the spiral through apertures 12*a* and 11*a* in the ground plate 12 and in the dielectric wall 11 adjacent thereto. The other terminal connection may be provided by extending the other end 10*b* of the conductor radially from the spiral beyond the edges of the dielectric walls 11, 11. The spiral 10 is formed of a conductor of sufficient diameter and strength to normally preserve a uniform spacing between successive turns, and it is pressed between the dielectric walls 11, 11 which provide further rigidity to the spiral. The upper (with reference to Fig. 2) dielectric wall 11 is not needed electrically, but provides mechanical support for the spiral.

Figure 3:
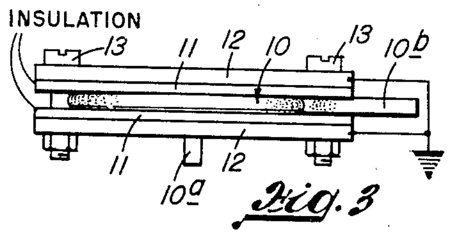
Fig. 3 is an elevational view similar to Fig. 2, but showing a modified construction.

The construction described with reference to Figs. 1 and 2 is desirable where a relatively high surge impedance is desired and where it is not necessary to shield one side of the spiral 10 from adjacent circuit elements.

Where it is desired that the tuning line be shielded on both sides and/or have a lower impedance, a ground member is placed on both sides of the spiral. Such a construction is shown in Fig. 3, in which reference numerals corresponding to those in Fig. 2 indicate corresponding parts. It will be observed that Fig. 3 differs from Fig. 2 only in the addition of a second ground plate 12 at the top side of the unit. The surge impedance of a line having two ground plates, as shown in Fig. 3, is approximately half that of a line having only one ground plate, as shown in Fig. 2.

Figure 4:
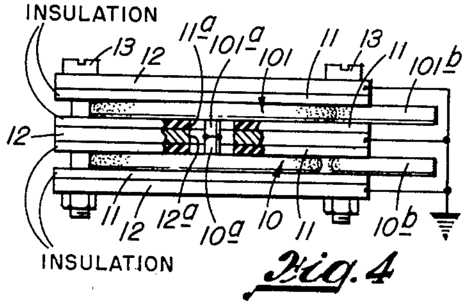
Fig. 4 is a front elevational view similar to Figs. 2 and 3, but showing still another modified construction.

The wave length of a device as shown in Figs. 1, 2 and 3 is roughly proportional to the length of conductor in the spiral and can be increased by increasing the diameter of the spiral. Because of space limitations, this may sometimes be undesirable, and the desired wave length can best be secured by using a plurality of stacked spirals of smaller diameter. Fig. 4 discloses a tuning line consisting of two stacked spirals connected in series with each other. Thus, the line of Fig. 4 consists of a stack comprising a first ground plate 12, a first dielectric wall 11, a first spiral 10, a second dielectric wall 11, a second ground plate 12, a third dielectric wall 11, a second spiral 101, a fourth dielectric wall 11, and a third ground plate 12, all clamped together by bolts 13. The two spirals 10 and 101 are connected in series by extending their inner ends 101*a* and 10*a* into contact with each other through apertures 11*a* in the second and third dielectric walls and a corresponding aperture 12*a* in the second ground plate, and electrically connecting them together either by pressure contact, soldering, welding or in any convenient manner. The outer ends of the conductor 10*b* and 101*b* are extended laterally beyond the stack for connection to the associated circuit. In the construction of Fig. 4, it is immaterial whether both spirals expand in the same direction or whether one expands clockwise and the other counter-clockwise.

Figure 5:
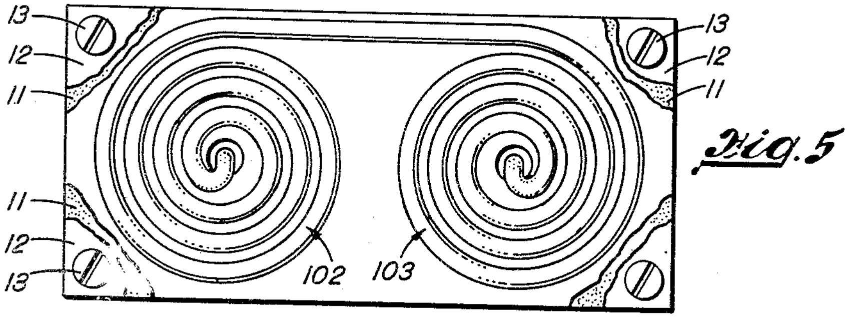
Fig. 5 is a plan view with portions broken away, showing still another modification of the invention.
Figure 6:
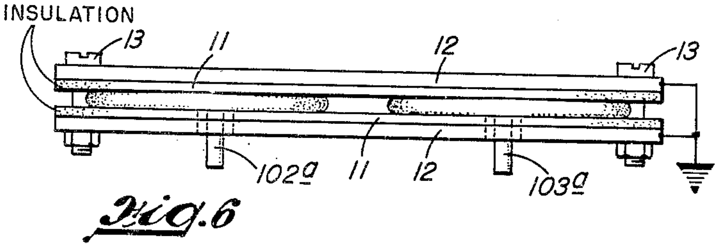
Fig. 6 is a front elevational view of the structure shown in Fig. 5.

Another construction for obtaining the necessary wave length with two spirals instead of one is shown in Figs. 5 and 6. Here, two spirals 102 and 103 are positioned in the same plane between two dielectric walls 11, 11 and two ground plates 12, 12, the outer ends of the two spirals being connected together by winding them from a single piece of wire. The inner ends 102*a* and 103*a* of the respective spirals are extended through apertures provided therefor in one of the dielectric walls and one of the ground plates for connection to the associated circuit.

Figure 8:
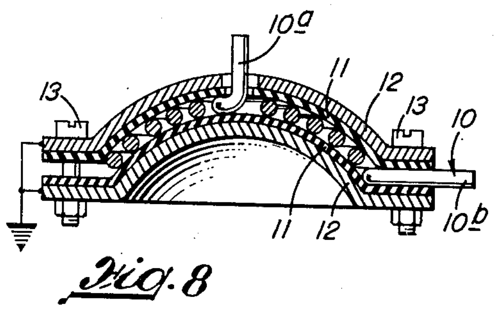
Figs. 7 and 8 are cross sections showing alternative forms of the invention employing non-planar spiral conductors.
Figure 7:
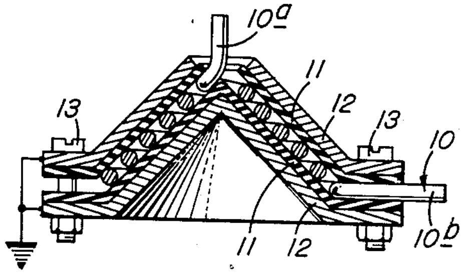

It is usually most practical to employ flat spirals. However, the invention is not restricted to flat spirals. They may be of conical shape, as disclosed in Fig. 7, which shows a construction corresponding exactly to that of Fig. 3, except that the spiral, the dielectric walls, and the ground plates are of generally conical shape instead of being planar. If occasion requires it, the elements might be curved (as shown in Fig. 8) instead of conical, it being necessary from a practical standpoint to have such symmetry as will make feasible the production of spirals, dielectric walls and ground plates of corresponding shape. In general, the necessary shape may be defined as a surface of revolution.

Figure 9:
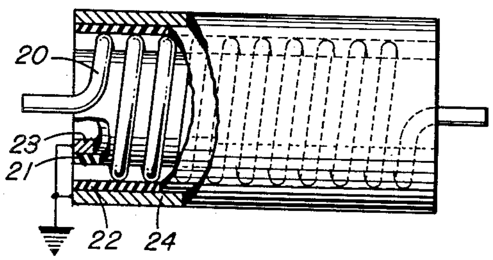
Fig. 9 is a side elevational view with portions broken away showing a form of the invention employing a helical conductor.
Figure 10:
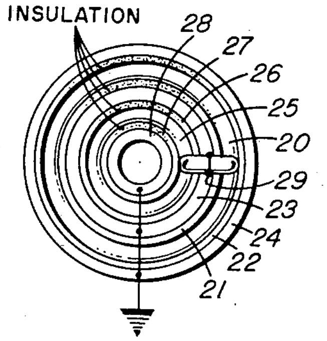
Fig. 10 is an end view showing a modification of the construction shown in Fig. 9.

It is feasible to use a conductive winding in the form of a helix and employ cylindrical ground members as shown in Figs. 9 and 10, although this shape is usually not as compact as the spiral form.

In Fig. 9 there is shown a helix 20 having closely spaced turns positioned between two concentric cylinders 21 and 22 of dielectric material, the assembly of elements 20, 21 and 22 being positioned between two cylindrical ground members 23 and 24 of conductive material. Either ground member can be eliminated if a higher surge impedance is desired, as with the spiral version of Fig. 2.

In Fig. 10 there is shown a modification of the structure of Fig. 9 in which a second helix 25 is positioned within the ground member 23 and separated therefrom by a dielectric cylinder 26. The second helix 25 may be wound on an inner dielectric cylinder 27, and another ground member may be provided within the cylinder 27 in the form of a conductive cylinder 28. The helixes 25 and 20 may be connected in series with each other as indicated at 29.

Although for the purpose of explaining the invention, a particular embodiment thereof has been shown and described, obvious modifications will occur to a person skilled in the art, and I do not desire to be limited to the exact details shown and described.

I claim:

1. A tuning line comprising: a flat spiral of conductive wire of sufficient diameter and strength to normally preserve a uniform spacing between successive turns, said spiral having its inner end extending axially away from one side of the spiral and its outer end extending radially from the spiral; a pair of dielectric plates on opposite sides of and sandwiching said spiral therebetween; a conductive ground plate coextensive with and lying against the outer side of that dielectric plate positioned on said one side of said spiral; said dielectric and ground plates being of larger radial dimensions than said spiral whereby they extend therebeyond; and means including tensile fastening means extending through said plates at points thereon radially beyond the limits of said spiral for clamping said plates and spiral together; said plates on said one side of said spiral having central apertures through which said inner end of said spiral extends.

2. A tuning line comprising, in stacked relation: a first conductive ground plate, a first dielectric plate, a first flat spiral of conductive wire, a second dielectric plate, a second ground plate, a third dielectric plate, a second flat spiral of conductive wire, a fourth dielectric plate, and a third ground plate; said second ground plate and second and third dielectric plates having registering central apertures, and said spirals having inner ends extending axially through said apertures into abutting contact with each other, and having outer ends extending radially from said stack; said plates being of larger radial dimensions than said spirals whereby they extend therebeyond, and means including tensile fastening means extending through said plates radially beyond the limits of said spiral for clamping said plates and spiral together without direct contact with said spirals.

References Cited in the file of this patent

UNITED STATES PATENTS

| | | |
|---|---|---|
| 1,456,909 | Rupin | May 29, 1923 |
| 2,362,470 | De Rosa | Nov. 14, 1944 |
| 2,602,856 | Rumsey | July 8, 1952 |
| 2,611,822 | Bliss | Sept. 23, 1952 |

FOREIGN PATENTS

| | | |
|---|---|---|
| 570,087 | Great Britain | June 21, 1945 |
| 601,514 | Great Britain | May 7, 1948 |